United States Patent
Almohsin et al.

(10) Patent No.: US 10,351,763 B2
(45) Date of Patent: Jul. 16, 2019

(54) INTERFACIAL TENSION REDUCTION AND WETTABILITY ALTERATION USING METAL OXIDE NANOPARTICLES TO REDUCE CONDENSATE BANKING

(71) Applicant: Saudi Arabian Oil Company, Dhahran (SA)

(72) Inventors: Ayman Mohammed Almohsin, Doha (SA); Mohammed Bataweel, Dhahran (SA); Eyad Alali, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/905,168

(22) Filed: Feb. 26, 2018

(65) Prior Publication Data

US 2018/0244985 A1    Aug. 30, 2018

Related U.S. Application Data

(60) Provisional application No. 62/463,962, filed on Feb. 27, 2017.

(51) Int. Cl.
| | |
|---|---|
| *E21B 43/24* | (2006.01) |
| *E21B 43/16* | (2006.01) |
| *C09K 8/84* | (2006.01) |
| *C09K 8/92* | (2006.01) |

(52) U.S. Cl.
CPC ............ *C09K 8/845* (2013.01); *C09K 8/92* (2013.01); *E21B 43/164* (2013.01); *E21B 43/24* (2013.01); *C09K 2208/10* (2013.01)

(58) Field of Classification Search
CPC ...... C09K 8/845; C09K 8/92; C09K 2208/10; E21B 43/164; E21B 43/24
USPC ........................................................ 166/303
See application file for complete search history.

(56) References Cited

U.S. PATENT DOCUMENTS

| | | | |
|---|---|---|---|
| 5,178,217 A | 1/1993 | Mohammadi et al. | |
| 7,712,528 B2* | 5/2010 | Langdon | E21B 36/02 166/263 |
| 2004/0157749 A1 | 8/2004 | Ely et al. | |
| 2010/0096139 A1* | 4/2010 | Holcomb | C09K 8/536 166/308.1 |

(Continued)

FOREIGN PATENT DOCUMENTS

| | | |
|---|---|---|
| CN | 104449631 | 3/2015 |
| WO | 2007017806 | 2/2007 |

(Continued)

OTHER PUBLICATIONS

International Search Report and Written Opinion issued in International Application No. PCT/US2018/019822 dated Jun. 6, 2018, 22 pages.

(Continued)

*Primary Examiner* — Silvana C Runyan
(74) *Attorney, Agent, or Firm* — Fish & Richardson P.C.

(57) ABSTRACT

Treating a gas condensate reservoir having a porous formation material includes introducing a formation treatment fluid to the gas condensate reservoir and maintaining the formation treatment fluid in the gas condensate reservoir. The formation treatment fluid is a dispersion including metal oxide nanoparticles, and the gas condensate reservoir includes discrete portions of condensate in contact with the porous formation material.

17 Claims, 5 Drawing Sheets

(56) References Cited

U.S. PATENT DOCUMENTS

| | | | | |
|---|---|---|---|---|
| 2010/0252259 | A1* | 10/2010 | Horton | C09K 8/64 |
| | | | | 166/271 |
| 2016/0304772 | A1* | 10/2016 | Al-Harbi | C09K 8/845 |
| 2017/0058186 | A1* | 3/2017 | Oghena | C09K 8/58 |

FOREIGN PATENT DOCUMENTS

| | | |
|---|---|---|
| WO | 2008118239 | 10/2008 |
| WO | 2015124214 | 8/2015 |

OTHER PUBLICATIONS

Esmaeilzadeh et al., "Wettability alteration of carbonate rocks from liquid-wetting to ultra gas-wetting using TiO2, SiO2 and CNT nanofluids containing flurochemicals, for enhanced gas recovery," Journal of Natural Gas Science and Engineering, vol. 26, Sep. 2015, 12 pages.

Gilardo et al., "Wettability alteration of sandstone cores by alumina-based nanofluids," Energy and Fuels, vol. 27, No. 7, Jul. 18, 2013, 7 pages.

Kondiparty et al., "Dynamic Spreading of Nanofluids on Solids. Part 1: Experimental," American Chemical Society, Langmuir vol. 28, Sep. 11, 2012, 6 pages.

Ogolo et al., "SPE: 160847: Enhanced Oil Recovery Using Nanoparticles," SPE International, presented at the SPE Saudi Arabia Section Technical Symposium and Exhibition, Apr. 8-11, 2012, 9 pages.

Sepehrinia and Mohammadi, "Wettability alteration properties of fluorinated silica nanoparticles in liquid-loaded pores: An atomistic simulation," Applied Surface Science vol. 371, May 15, 2016, 11 pages.

Villamizar et al., "SPE 129901: Interfacially Active SWNT/Silica Nanohybrid Used in Enhanced Oil Recovery," SPE International, presented at the 2010 SPE Improved Oil Recovery Symposium, Apr. 26-28, 2010, 11 pages.

* cited by examiner

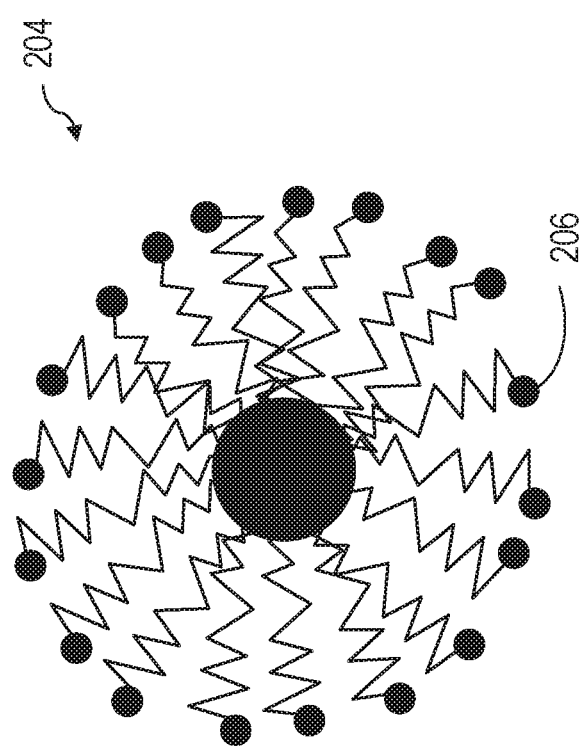

INTERFACIAL TENSION REDUCTION AND WETTABILITY ALTERATION USING METAL OXIDE NANOPARTICLES TO REDUCE CONDENSATE BANKING

CROSS-REFERENCE TO RELATED APPLICATION

This application claims the benefit of U.S. Application Ser. No. 62/463,962 entitled "INTERFACIAL TENSION REDUCTION AND WETTABILITY ALTERATION USING METAL OXIDE NANOPARTICLES TO REDUCE CONDENSATE BANKING" and filed on Feb. 27, 2017, which is incorporated herein by reference in its entirety.

TECHNICAL FIELD

This document relates to the use of nanoparticles in formation treatment fluids to reduce condensate banking in a gas condensate reservoir.

BACKGROUND

When the pressure in a gas condensate reservoir is reduced below the dew point, the fluid separates into a liquid phase and a vapor phase. Thus, a decrease in pressure results in a phase change from a liquid to a gas, referred to as "retrograde condensation." In the region near the wellbore, the pressure gradient is steeper, resulting in a greater liquid/gas ratio. Depending on the critical liquid saturation and gas flow rate, the liquid saturation can build up quickly, thereby hindering the flow of gas. Under such conditions, high surface energy minerals promote spreading of condensate film on the rock surface, wetting out pore surfaces, and condensate accumulates. The accumulated condensate restricts open paths for flowing gas, thereby reducing well productivity.

SUMMARY

In a first general aspect, treating a gas condensate reservoir having a porous formation material includes introducing a formation treatment fluid to the gas condensate reservoir and maintaining the formation treatment fluid in the gas condensate reservoir. The formation treatment fluid is a dispersion including metal oxide nanoparticles. The gas condensate reservoir includes discrete portions of condensate in contact with the porous formation material. The formation treatment fluid is maintained in the gas condensate reservoir, such that the discrete portions of condensate are displaced from the porous formation material to yield free condensate in the gas condensate reservoir.

Implementations of the first general aspect may include one or more of the following features.

In some implementations, the formation treatment fluid is maintained in the gas condensate reservoir for sufficient time for the formation treatment fluid to form a wedge film between the discrete portions of condensate and the porous formation material.

Some implementations include removing the free condensate from the gas condensate reservoir.

In some implementations, the metal oxide nanoparticles have a maximum dimension in a range of 1 nanometer (nm) to 100 nm.

In some implementations, a concentration of the metal oxide nanoparticles in the formation treatment fluid is up to 1 weight percent (wt %).

In some implementations, a particle volume fraction of the metal oxide nanoparticles in the formation treatment fluid is up to 0.25.

In some implementations, the metal oxide nanoparticles include an oxide of silicon, aluminum, zinc, magnesium, iron, zirconium, nickel, or tin, or a combination thereof. In certain implementations, the metal oxide nanoparticles include silica.

In some implementations, the formation treatment fluid includes supercritical carbon dioxide.

BRIEF DESCRIPTION OF THE DRAWINGS

FIG. 2B depicts an enlarged view of a nanoparticle of the formation treatment fluid of FIG. 2A.

DETAILED DESCRIPTION

Condensate that precipitates near wellbore pores by a gas that passes through the dew point as it nears the wellbore reduces the permeability of the pores to gas through relative permeability effects. This phenomenon is referred to as "condensate banking." The effect of condensate banking may be decreased by increasing the wettability of the porous formation in the gas condensate reservoir by gas relative to that by liquid in the formation, thereby increasing production of gas from wells in the gas condensate reservoir.

The wettability of the porous formation to gas can be increased by contacting the porous formation with a formation treatment fluid including a base fluid and nanoparticles. Examples of suitable base fluids include aqueous fluids and supercritical carbon dioxide. In some implementations, the base fluid includes at least 10 weight percent (wt %) of water. In some implementations, the base fluid includes up to 99.9 wt % of water. In some implementations, the base fluid has a water composition in a range of 10 wt % to 90 wt %. Examples of suitable metal oxide nanoparticles include oxides of silicon, aluminum, zinc, magnesium, iron, zirconium, nickel, tin, or a combination thereof. In some implementations, the metal oxide nanoparticles have a largest dimension in a range of 1 nanometer (nm) to 100 nm. A concentration of nanoparticles in the formation treatment fluid is typically up to 1 wt %. In some implementations, the concentration of nanoparticles in the formation treatment fluid is at least 0.1 wt %.

In some implementations, the formation treatment fluid is a colloidal dispersion. In some implementations, the formation treatment fluid includes one or more additives. The formation treatment fluid can have an additive concentration in a range of 0.01 wt % to 10 wt %. Examples of additives include surfactants, polymers, acids, bases, and solutes. Suitable surfactants include anionic surfactants, such as sodium dodecylbenzenesulfonate. Examples of suitable polymers include xanthan gum, partially hydrolyzed polyacrylamide, and sodium hexadecyl diphenyl oxide disulfonate. Suitable acids include hydrochloric acid. Suitable bases include sodium hydroxide. Suitable solutes include stearic acid.

The colloidal dispersion is typically a stable colloidal dispersion, such that the nanoparticles in the treatment fluid flow through pores in the porous formation. The stability of the colloidal dispersion is based at least in part on factors such as the size, shape, charge, and degree of solvation of the nanoparticles, as well as the potential of hydrogen (pH) of the colloidal dispersion and the nature and concentration of additives in the dispersion.

Figure 1:
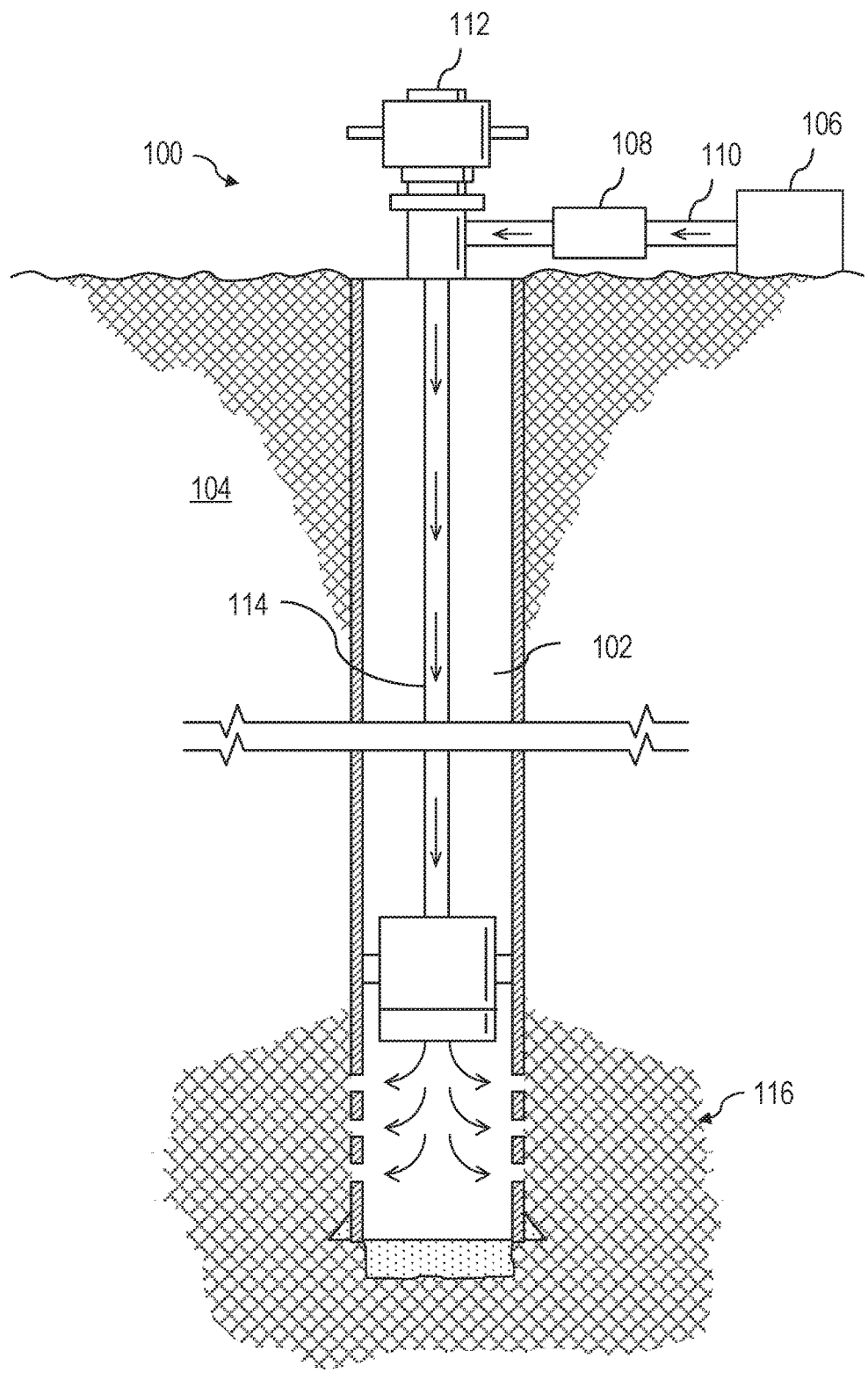
FIG. 1 depicts an example system for providing a formation treatment fluid to a gas condensate reservoir.

FIG. 1 depicts an example system 100 for delivering formation treatment fluid to wellbore 102 in subterranean formation 104. Formation treatment fluid from source 106 is pumped via pump 108 through line 110 to wellhead 112, and enters wellbore 102 via pipe 114. Formation treatment fluid enters gas condensate reservoir 116 through pores in the formation.

Figure 2A:
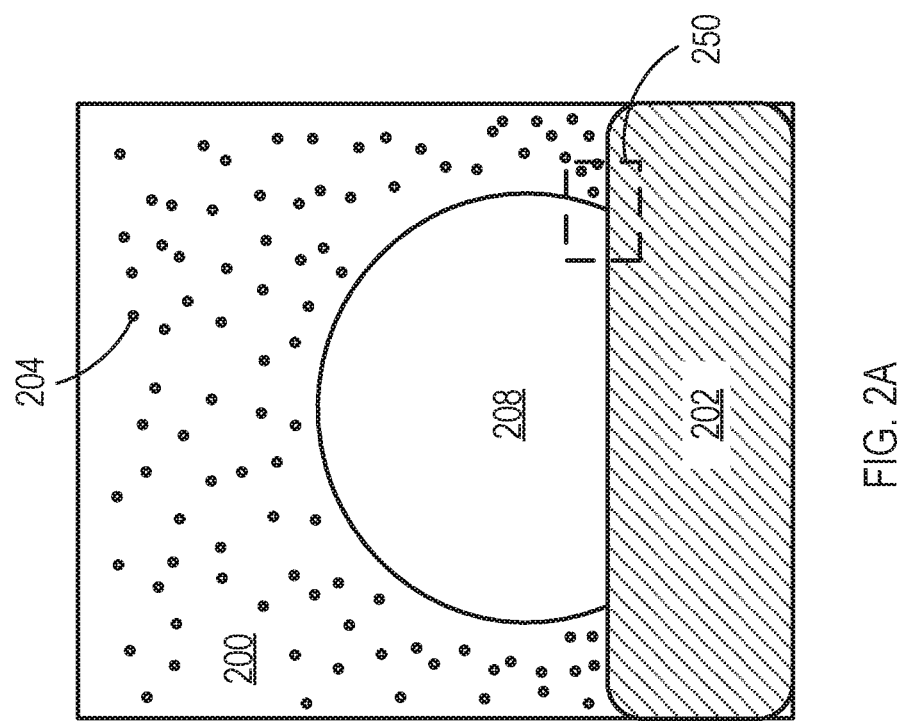
FIG. 2A depicts a formation treatment fluid in contact with formation in a gas condensate reservoir.

FIG. 2A depicts an example of a formation treatment fluid 200 in contact with formation 202 in a gas condensate reservoir, such as the gas condensate reservoir 116. Formation treatment fluid 200 is a colloidal dispersion including metal oxide nanoparticles 204.

FIG. 2B depicts an enlarged view of metal oxide nanoparticle 204 with additive 206 positioned about the nanoparticle. In some implementations, additive 206 is a surfactant selected to disperse metal oxide nanoparticle 204 in formation treatment fluid 200. Condensate 208 is in contact with formation treatment fluid 200 and formation 202.

Figure 2C:
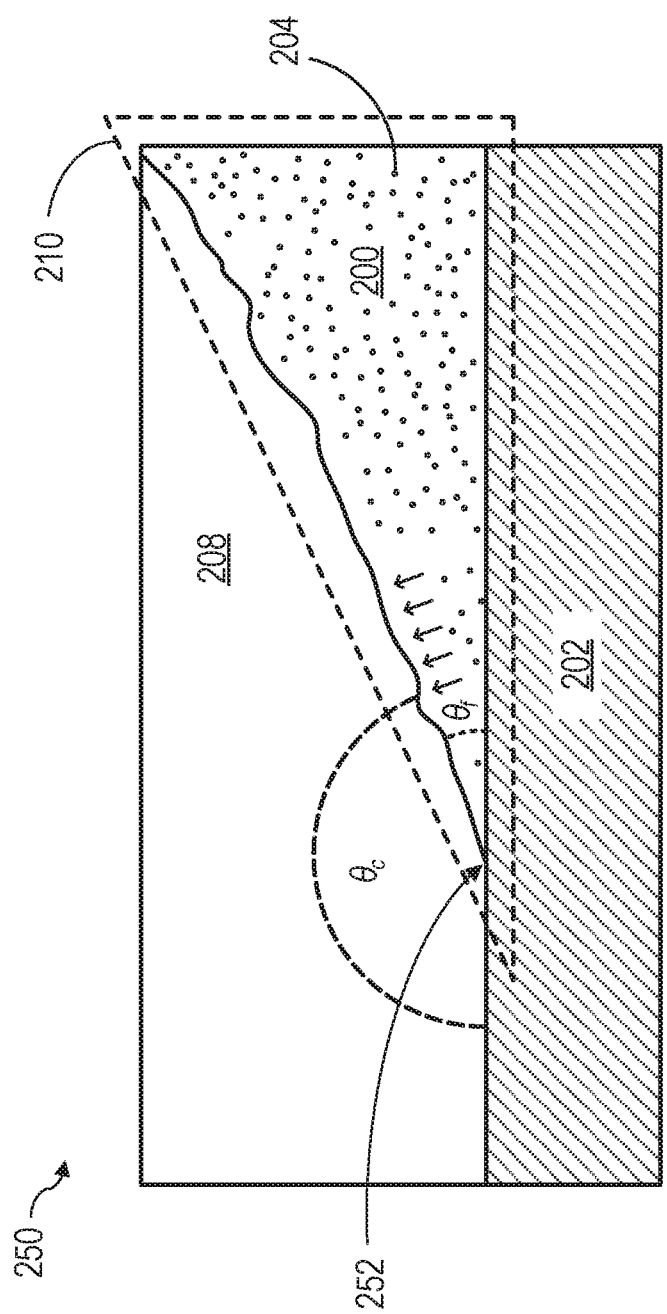
FIG. 2C depicts an enlarged view of the contact region of the formation treatment fluid and the gas condensate reservoir of FIG. 2A.

FIG. 2C depicts an enlarged view of the region in which formation treatment fluid 200, formation 202, and condensate 208 are in contact, where the angle $\theta_c$ is the contact angle between the condensate and the formation. When the contact angle $\theta_c$ between formation 202 and condensate 208 is greater than the contact angle $\theta_f$ between formation treatment fluid 200 and formation 202, the formation treatment fluid has a tendency to produce a wedge film 210. The contact angle $\theta_c$ between condensate droplet 208 and formation 202 can increase due at least in part to preferential wetting of the formation 202 with the formation treatment fluid 200. Here, "wedge film" generally refers to a wedge-shaped volume of formation treatment fluid 200 in contact with formation 202 and condensate 208 at the interface between the formation 202 and the condensate 208. Thus, the formation treatment fluid 200 intervenes between the formation 202 and the condensate 208, dislodging the condensate 208 from the formation 202 and thereby decreasing condensate banking.

Separation of condensate 208 from formation 202 occurs due at least in part to Brownian motion and electrostatic repulsion between metal oxide nanoparticles 204. While the force imparted by a single metal oxide nanoparticle 204 is small, the force is greater for a large particle volume fraction, such as a particle volume fraction up to 0.25. Here, "particle volume fraction" generally refers to the ratio of the volume of the nanoparticles (such as the metal oxide nanoparticles 204) to the volume of the total fluid (such as the formation treatment fluid 200). The particle volume fraction depends on the concentration of nanoparticles in the fluid (for example, in weight percent), the density of the nanoparticles, and the density of the the fluid in which the nanoparticles are dispersed. For a large particle volume fraction, the force can exceed 50,000 Pascal (Pa) at the vertex 252. In some implementations, the particle volume fraction of the formation treatment fluid 200 is at least 0.01. In some implementations, the particle volume fraction of the formation treatment fluid 200 is at least 0.1. In some implementations, the particle volume fraction of the formation treatment fluid 200 is in a range of 0.1 to 0.2. When this force is spatially confined to the vertex 252 of the discontinuous phases (that is, between formation 202 and condensate 208), formation treatment fluid 200 displaces the condensate 208, as equilibrium is reestablished.

Figure 3:
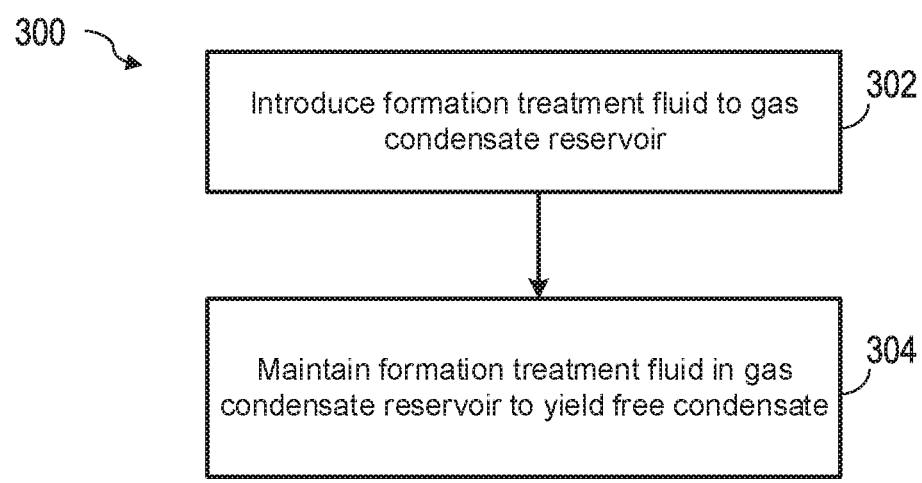
FIG. 3 is a flow chart for an example process for reducing condensate banking in a gas condensate reservoir.

FIG. 3 is a flowchart for an example process 300 for reducing condensate banking in a gas condensate reservoir, such as the gas condensate reservoir 116. The method 300 can be carried out to treat the gas condensate reservoir 116, which includes a porous formation material. At 302, a formation treatment fluid (such as the formation treatment fluid 200) is provided to the gas condensate reservoir. The formation treatment fluid is a dispersion including metal oxide nanoparticles, and the gas condensate reservoir includes discrete portions of condensate in contact with the porous formation material. At 304, the formation treatment fluid is maintained in the gas condensate reservoir. Maintaining the formation treatment fluid in the gas condensate reservoir causes the discrete portions of condensate to be displaced from the porous formation material to yield free condensate in the gas condensate reservoir. The formation treatment fluid can be maintained in the gas condensate reservoir for sufficient time for the formation treatment fluid to form a wedge film between the discrete portions of condensate and the porous formation material. Here, "free condensate" generally refers to a volume of condensate that is not in contact with the formation. In some implementations, the free condensate displaced with the formation treatment fluid is removed from the gas condensate reservoir.

Definitions

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise. "About" can allow for a degree of variability in a value or range, for example, within 10%, within 5%, or within 1% of a stated value or of a stated limit of a range.

The term "fluid" refers to gases, liquids, gels, slurries with a high solids content, and critical and supercritical materials.

The term "subterranean formation" refers to any material under the surface of the earth, including under the surface of the bottom of the ocean. For example, a subterranean formation can be any section of a wellbore and any section of a subterranean petroleum- or water-producing formation or region in fluid contact with the wellbore. In some examples, a subterranean formation can be any below-ground region that can produce liquid or gaseous petroleum materials, water, or any section below-ground in fluid contact therewith. For example, a subterranean formation can be at least one of an area desired to be fractured, a fracture, or an area surrounding a fracture, and a flow pathway or an area surrounding a flow pathway, where a fracture or a flow pathway can be optionally fluidly connected to a subterranean petroleum- or water-producing region, directly or through one or more fractures or flow pathways.

OTHER IMPLEMENTATIONS

It is to be understood that while implementations have been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating a gas condensate reservoir comprising a porous formation material, the method comprising:
    introducing a formation treatment fluid to the gas condensate reservoir, wherein the gas condensate reservoir comprises condensate in contact with the porous formation material, and the formation treatment fluid is a dispersion comprising:
        metal oxide nanoparticles; and
        at least one additive selected from a group consisting of xanthan gum, partially hydrolyzed polyacrylamide, sodium hexadecyl diphenyl oxide disulfonate, hydrochloric acid, sodium hydroxic, and stearic acid; and
    maintaining the formation treatment fluid in the gas condensate reservoir, such that at least a portion of the condensate is displaced from the porous formation material to yield free condensate in the gas condensate reservoir.

2. The method of claim 1, wherein the formation treatment fluid is maintained in the gas condensate reservoir for sufficient time for the formation treatment fluid to form a wedge film between the condensate and the porous formation material.

3. The method of claim 1, further comprising removing the free condensate from the gas condensate reservoir.

4. The method of claim 1, wherein the metal oxide nanoparticles have a maximum dimension in a range of 1 nanometer (nm) to 100 nm.

5. The method of claim 1, wherein a concentration of the metal oxide nanoparticles in the formation treatment fluid is up to 1 weight percent (wt %).

6. The method of claim 1, wherein the metal oxide nanoparticles comprise an oxide of silicon, aluminum, zinc, magnesium, iron, zirconium, nickel, or tin, or a combination thereof.

7. The method of claim 1, wherein the metal oxide nanoparticles comprise silica nanoparticles.

8. The method of claim 1, wherein the formation treatment fluid comprises supercritical carbon dioxide.

9. The method of claim 5, wherein the concentration of the metal oxide nanoparticles in the formation treatment fluid is at least 0.1 wt %.

10. The method of claim 1, wherein the formation treatment fluid comprises an additive having a concentration in the formation treatment fluid in a range of 0.01 wt % to 10 wt %.

11. The method of claim 10, wherein the additive comprises a surfactant, a polymer, an acid, a base, a solute, an alcohol, or combinations thereof.

12. The method of claim 1, wherein a particle volume fraction of the metal oxide nanoparticles in the formation treatment fluid is up to 0.25.

13. The method of claim 12, wherein the formation treatment fluid is configured to apply a force greater than 50,000 Pascal at a vertex between the porous formation material and the condensate.

14. The method of claim 12, wherein the particle volume fraction of the metal oxide nanoparticles in the formation treatment fluid is at least 0.01.

15. The method of claim 14, wherein the particle volume fraction of the metal oxide nanoparticles in the formation treatment fluid is in a range of 0.01 to 0.2.

16. The method of claim 15, wherein the particle volume fraction of the metal oxide nanoparticles in the formation treatment fluid is at least 0.1.

17. The method of claim 16, wherein the particle volume fraction of the metal oxide nanoparticles in the formation treatment fluid is in a range of 0.1 to 0.2.

* * * * *